US008157249B2

(12) United States Patent
Hansen et al.

(10) Patent No.: US 8,157,249 B2
(45) Date of Patent: Apr. 17, 2012

(54) AIR DISPERSER FOR A SPRAY DRYER AND A METHOD FOR DESIGNING AN AIR DISPERSER

(75) Inventors: Ove Emil Hansen, Allerød (DK); Thorvald Uhrskov Ullum, Frederiksberg (DK)

(73) Assignee: Niro A/S, Soborg (DK)

( * ) Notice: Subject to any disclaimer, the term of this patent is extended or adjusted under 35 U.S.C. 154(b) by 863 days.

(21) Appl. No.: 12/158,194

(22) PCT Filed: Dec. 22, 2005

(86) PCT No.: PCT/DK2005/000820
§ 371 (c)(1), (2), (4) Date: Sep. 15, 2008

(87) PCT Pub. No.: WO2007/071238
PCT Pub. Date: Jun. 28, 2007

(65) Prior Publication Data
US 2009/0008805 A1 Jan. 8, 2009

(51) Int. Cl.
*B01F 3/04* (2006.01)

(52) U.S. Cl. .......................................... 261/78.2; 261/79.2

(58) Field of Classification Search ................. 261/78.2, 261/79.2
See application file for complete search history.

(56) References Cited

U.S. PATENT DOCUMENTS

| | | | | |
|---|---|---|---|---|
| 4,227,896 | A | 10/1980 | Larsson et al. | |
| 4,519,990 | A * | 5/1985 | Bevilaqua et al. | 423/210 |
| 4,571,311 | A | 2/1986 | Ferguson, Jr. et al. | |
| 4,619,404 | A * | 10/1986 | Rasmussen | 239/461 |
| 4,668,441 | A | 5/1987 | Hess et al. | |
| 5,032,222 | A | 7/1991 | Millioud | |
| 5,227,018 | A * | 7/1993 | Bro et al. | 159/4.02 |
| 6,763,947 | B1 * | 7/2004 | Brooks | 209/170 |

FOREIGN PATENT DOCUMENTS

| | | | |
|---|---|---|---|
| FR | 1 289 817 | A | 4/1962 |
| JP | 2-52020 | * | 2/1990 |

* cited by examiner

*Primary Examiner* — Charles Bushey
(74) *Attorney, Agent, or Firm* — Sughrue Mion, PLLC

(57) ABSTRACT

The air disperser (1) includes an air inlet (2), a pipe (3) defining an air outlet area equipped with one or more atomizers (4), an outer wall (7) and a space (8) defined by the pipe wall (9) and the outer wall (7) of the air disperser. The space (8) has a plurality of guide vanes (10*a*-10*l*) positioned substantially vertically in the axial direction and substantially on the radii between the pipe wall (9) and the outer wall (7) of the air disperser. At least one (10*e*) of the guide vanes is covering at least 90% of the full radius from the pipe wall (9) in the direction towards the outer wall (7) of the air disperser, and the rest of said guide vanes being distributed on radii along the circumference of the pipe (3).

20 Claims, 2 Drawing Sheets

AIR DISPERSER FOR A SPRAY DRYER AND A METHOD FOR DESIGNING AN AIR DISPERSER

FIELD OF THE INVENTION

The present invention relates to an air disperser for a spray dryer, comprising an air inlet, a pipe defining an air outlet area equipped with one or more atomizing means, said pipe having a longitudinal axis defining an axial direction and a radial direction extending substantially perpendicularly to said axial direction, an outer wall and a space defined by the pipe wall and the outer wall of the air disperser, said space having a plurality of guide vanes. Furthermore, the present invention relates to a method for designing an air disperser.

BACKGROUND OF THE INVENTION

An air disperser must be included in a spray dryer in order to obtain a more uniform drying of the liquid to be atomized. The drying air is brought into contact with the liquid to be atomized through a pipe equipped with one or more nozzles through which the liquid is streaming. The drying air is entering the pipe from the air disperser. Hence, it is the aim to obtain a uniform distribution of drying air in the air disperser in order to obtain a uniform and symmetrical downward flow of drying air in the pipe and further into the drying chamber of the spray dryer.

In the air dispersers known today it may be difficult to obtain a uniform and symmetrical flow of the drying air. These difficulties are most often due to the construction upstream of the supply pipe for the drying air, but may also be due to the design of the air disperser. If the drying air is not uniformly distributed in the air disperser, then neither the flow of drying air will be uniformly distributed at the point where the drying air and the liquid to be atomized are brought together. Consequently, a non-uniform drying process will be performed resulting in for example formation of deposits on the wall inside of the drying chamber, production of a product of less quality and a reduced capacity.

For many years it has been known to incorporate guide vanes in air dispersers in order to improve the distribution of drying air inside of the air disperser. For example in U.S. Pat. No. 4,227,896 (Niro) a gas distribution device for the supply of a processing gas to an atomizing chamber is described, said device containing two vane sets positioned opposite to each other in order to obtain a more uniform downwards directed flow of the drying air. However, this design aims at a rotational flow.

As an alternative solution perforated plates have been introduced in such air dispersers in order to avoid turbulence in the air flow and hence to obtain a more uniform distribution of the air (see for example FR 1.289.817 (Niro)). However, the use of such perforated plates have shown to cause difficulties in respect of keeping the perforated plates clean. Especially, when the spray dryer is to be used in the food or pharmaceutical industry the sanitary aspects of the production design are very important.

SUMMARY OF THE INVENTION

It is an object of the invention to provide an air disperser for a spray dryer having an improved performance by enabling a substantially symmetrical flow of drying air.

In one aspect of the invention this is achieved by the provision of an air disperser for a spray dryer of the kind mentioned in the introduction, which is furthermore characterized in that at least one of the guide vanes is covering at least 90% of the full radius from the pipe wall in the direction towards the outer wall of the air disperser, and that the rest of the guide vanes are distributed on radii along the circumference of the pipe.

By incorporating a number of guide vanes into the air disperser in the manner provided for by the present invention, the guide vanes distribute the incoming drying air. Doing so in an optimal manner in turn entails that deposits on the inside of the walls of the drying chamber can be avoided and the drying capacity as well as drying economy is markedly improved. Furthermore, as a result of the design of the guide vanes, said guide vanes and the entire air disperser are easy to keep clean and, consequently, such a design is very suitable for use in the food industry as well as in the pharmaceutical industry. Additionally, the pressure drop in the air disperser is less than the pressure drop in known air dispersers and, hence, the energy consumption is markedly decreased in comparison to known air dispersers.

By the term "air disperser" as used herein is meant any disperser supplied with a drying gas to be used in the spray dryer. A skilled person will know that air is often used as the drying gas when the liquid to be atomized is an aqueous solution, while an inert gas is more likely used, when the liquid to be atomized is a non-aqueous solution. Consequently, the term "drying air" covers all types of drying gas, which may be used in the spray drying process. Additionally, the term "spray drying" should be interpreted as embracing any process including drying, cooling and conditioning of a feed.

Preferably, the guide vanes are spaced from each other in such a way that the length of the curved pipe wall between any two neighbouring guide vanes is substantially identical. Such a symmetrical distribution of the guide vanes has shown to give the best performance of the air disperser when aiming at the uniform and symmetrical down-ward flow of drying air in the pipe. However, in some designs the distance between guide vanes may vary.

In one embodiment of the invention the shape of each guide vane is substantially plane, while in another embodiment of the invention the shape of each guide vane is curved in the axial direction and/or in the radial direction. The preferred shape in a given situation depends on the rest of the design of the air disperser, such as the design of the supply pipe for drying air.

The drying air may enter the air disperser in different modes. Hence, the drying air may e.g. be provided radially, tangentially or from the top of the air disperser in a downward direction.

In one design of the air disperser the air inlet in the air disperser is a radial air inlet. In such air dispersers, the number of guide vanes lies between 3 and 20, preferably between 5 and 12. The guide vane positioned at the air inlet may or may not be present in the air disperser. Hence, when the guide vane positioned at the air inlet is not present, the rest of the guide vanes are only positioned in the space between 10° and 350° from the air inlet.

The size of each of the guide vanes depends on the design of the air disperser as well as the air flow needed in order to obtain an acceptable drying. Hence, in one preferred embodiment, the guide vane positioned opposite to the air inlet is covering at least 90% of the full radius from the pipe wall in the direction towards the outer wall of the air disperser. In another preferred embodiment, the guide vane positioned opposite to the air inlet is covering substantially the full radius between the pipe wall and the outer wall of the air disperser. However, the guide vane opposite to the air inlet may cover any length of the radius in the range of 90% of the radius to the full radius. The purpose of this guide vane is to prevent rotation of the incoming air.

In yet another preferred embodiment the guide vanes increase in size in such a way that the guide vane closest to the air inlet is the smallest guide vane covering the smallest part of the radius between the pipe wall and the outer wall of the air disperser and the guide vane opposite to the air inlet is the largest guide vane covering most of the radius between the pipe wall and the outer wall of the air disperser. In cases where the guide vane positioned at the air inlet is not present, the two guide vanes closest to the air inlet are the smallest guide vanes. Alternatively, only one of the two guide vanes closest to the air inlet is the smallest one. In the most preferred embodiment, the guide vanes are positioned symmetrically with regard to a vertical plane seen from the air inlet to the guide vane opposite the air inlet in respect of the positions and the sizes of the guide vanes.

In another design of the air disperser, the air inlet is a tangential air inlet. In such a design the preferred number of guide vanes lies between 4 and 30, preferably between 12 and 24. Furthermore, in this design the guide vane covering at least 90% of the full radius from the pipe wall in the direction towards the outer wall of the air disperser is the guide vane positioned at approximately 360° from the air inlet. In another preferred embodiment, the guide vane positioned at approximately 360° from the air inlet is covering the full radius between the pipe wall and the outer wall of the air disperser.

The size of each guide vane may vary depending on the design of the air disperser. However, in a preferred embodiment the guide vanes increase in size in such a way that the air coming from the air inlet first meets the smallest guide vane covering the smallest part of the radius between the pipe wall and the outer wall of the air disperser and the guide vane positioned at approximately 360° from the air inlet is the largest guide vane covering most of the radius between the pipe wall and the outer wall of the air disperser. Such a positioning of the guide vanes has shown to give the best performance of the air disperser when aiming at the uniform and symmetrical downward flow of drying air in the pipe.

Independently of the position of the air inlet, in yet another preferred embodiment the size of each guide vane is identical apart from the one guide vane covering substantially the full radius. The distance between guide vanes may be the same or may vary.

When performing the spray drying process, the axial velocity of the drying air in the pipe may lie in the range of 1 to 60 m/s. Furthermore, the overall normalized standard deviation on axial velocities is less than 8%, preferably less than 6%.

In another aspect of the invention a method for designing an air disperser is provided. Such a method comprises the steps of:

- selecting a number of guide vanes in an air disperser of a certain design,
- selecting the size of each guide vanes in an air disperser of a certain design, and
- selecting the position of each guide vane.

A skilled person would recognize that any kind of computational fluid dynamics program (CFD program) may be used as means of aid, when determining the specific best mode of design of the air disperser according to the invention taking upstream ducting and flow into account. As an example of such a computational fluid program suitable for use in the present invention, FLUENT may be mentioned.

Furthermore, in a preferred embodiment of the method according to the present invention, the size of each guide vane is varied by using adjustable guide vanes for testing purposes, before the permanent guide vanes are manufactured and welded into the air disperser.

DETAILED DESCRIPTION OF THE INVENTION AND OF PREFERRED EMBODIMENTS

Figure 1:
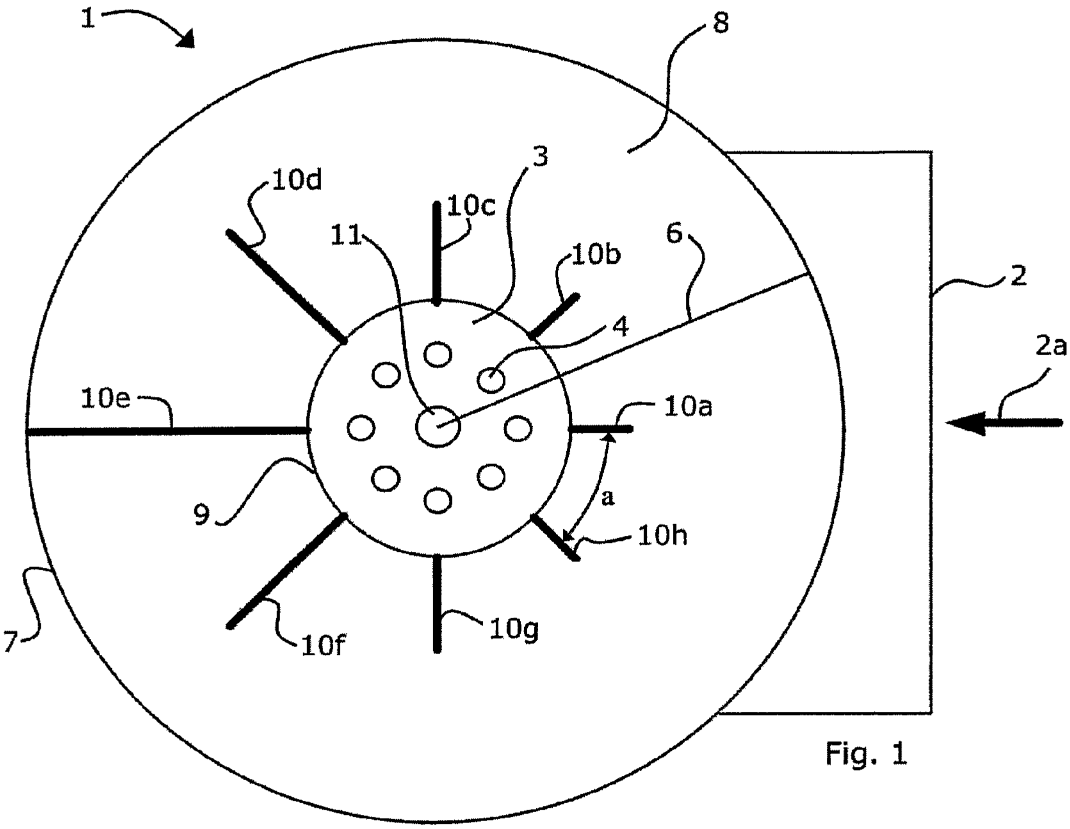
FIG. 1 shows a plane view of an air disperser for a spray dryer having a radial air inlet and an arrangement of guide vanes in a first embodiment of the invention.
Figure 2:
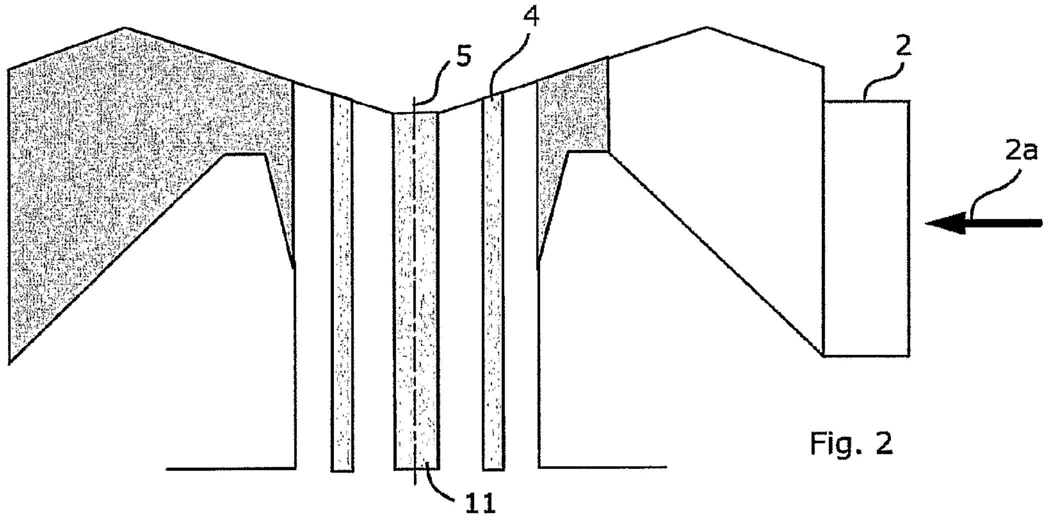
FIG. 2 shows a side view of the air disperser shown in FIG. 1.

FIGS. 1 and 2 show one preferred embodiment of an air disperser 1 for a spray dryer (not shown), comprising an air inlet 2 (the direction of the flow being indicated by an arrow 2*a*), which is a radial air inlet, a pipe 3 defining an air outlet area equipped with eight nozzles 4, said pipe having a longitudinal axis defining an axial direction 5 and a radial direction 6 extending substantially perpendicularly to said axial direction. The air disperser 1 has an outer wall 7 and a space 8 defined by the pipe wall 9 and the outer wall 7 of the air disperser, said space having, in the embodiment shown, eight guide vanes 10 (denoted 10*a* to 10*h*). In the air disperser shown in FIG. 1, the guide vanes are positioned substantially vertically in the axial direction and substantially on the radii between the pipe wall 9 and the outer wall 7 of the air disperser. In the embodiment shown in FIG. 1 one of the guide vanes 10*e* is covering the full radius between the pipe wall and the outer wall of the air disperser, and the rest of the guide vanes are distributed on radii along the circumference of the pipe. Eventually, the air disperser 1 is provided with a pipe 11 for the return of fines to the drying chamber. The pipe 3, if including more than one nozzle, may be composed of a number of pipes, which encircles a nozzle each. The air disperser 1 is mounted in the ceiling of the drying chamber of the spray dryer. Depending on i.a. the size of the drying chamber, there may be more than one, e.g. three such air dispersers mounted in the ceiling of the drying chamber.

In the embodiment shown in FIG. 1 the air disperser guide vanes are spaced from each other in such a way that the length a of the curved pipe wall 9 between any two neighbouring guide vanes 10*h* and 10*a* is substantially identical. In the embodiment shown in FIG. 1 the shape of each guide vane 10*a*-10*h* is substantially plane.

As may be seen in FIG. 1, the guide vanes increase in size in such a way that the guide vane 10*a* closest to the air inlet 2 is the smallest guide vane covering the smallest part of the radius between the pipe wall 9 and the outer wall 7 of the air disperser, and the guide vane 10*e* positioned opposite to the air inlet 2 is the largest guide vane covering the full radius between the pipe wall 9 and the outer wall 7 of the air disperser. Furthermore, the guide vanes are positioned symmetrically with regard to a vertical plane seen from the air inlet 2 to the guide vane 10*e* opposite the air inlet in respect of the positions and the sizes of the guide vanes.

Figure 3:
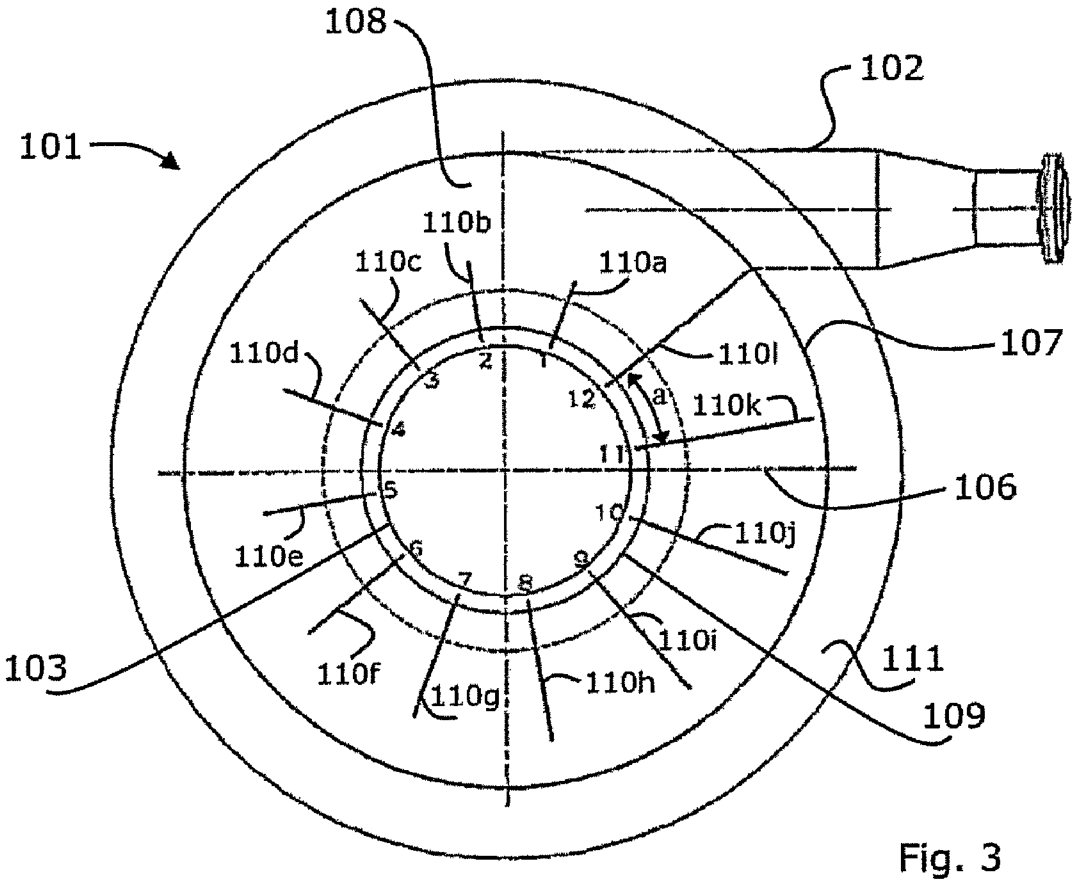
FIG. 3 shows a plane view of an air disperser for a spray dryer having a tangential air inlet and an arrangement of guide vanes in a second embodiment of the invention.
Figure 4:
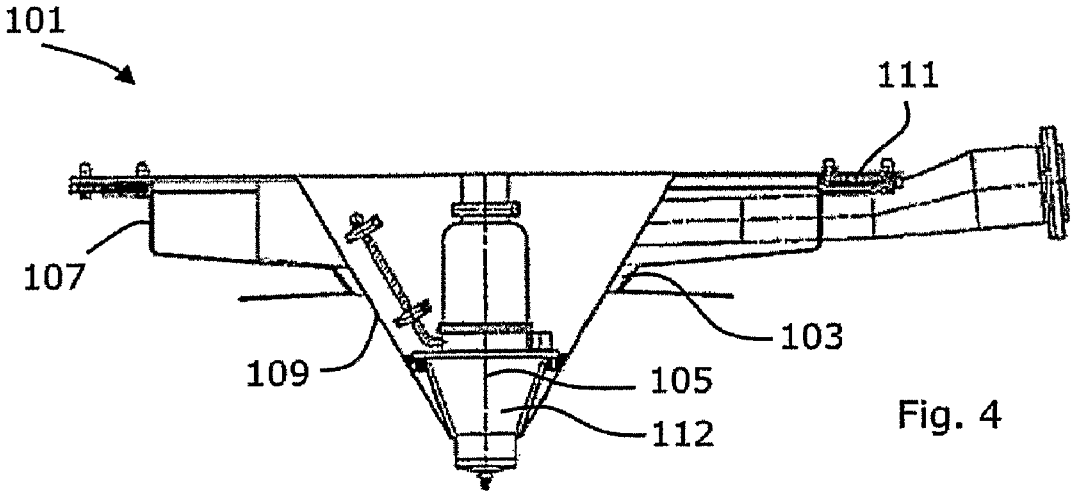
FIG. 4 shows a side view of the air disperser shown in FIG. 3.

FIGS. 3 and 4 show another preferred embodiment of an air disperser 101 for a spray dryer, comprising an air inlet 102, which is a tangential air inlet, a pipe 103 defining an air outlet area equipped with a rotary atomizer 112, said pipe having a longitudinal axis defining an axial direction 105 and a radial direction 106 extending substantially perpendicularly to said axial direction. The air disperser 101 has an outer wall 107 and a space 108 defined by the pipe wall 109 and the outer wall 107 of the air disperser, said space having twelve guide vanes 110 (denoted 110*a* to 110*l*). In the embodiment of the air disperser shown in FIG. 3, the guide vanes are positioned substantially vertically in the axial direction and substantially on the radii between the pipe wall 109 and the outer wall 107 of the air disperser. In the embodiment shown in FIG. 3 one of the guide vanes 1101 is covering the full radius between the pipe wall 109 and the outer wall 107 of the air disperser, and the rest of said guide vanes are distributed on radii along the circumference of the pipe wall 109. The air disperser 101 is mounted in the ceiling of the drying chamber of the spray dryer, e.g. by means of the flange 111. As in the first embodiment, there may be more than one air disperser in the spray dryer.

The air disperser shown in FIG. 3 contains twelve guide vanes of various sizes and the shape of each guide vanes is substantially plane. In the embodiment of FIG. 3 the guide vanes are spaced from each other in such a way that the length a of the curved pipe wall between any two neighbouring guide vanes is substantially identical One guide vane (110*l*) is covering the full radius between the pipe wall and the outer wall of the air disperser. This is the guide vane positioned at approximately 360° from the air inlet. As is shown most clearly in FIG. 3 this guide vane 110*l* is secured to the outer wall 107 at the point on which the air inlet 102 intersects the outer wall 107. The air is thus able to flow in the space 108 in counter-clockwise direction until it finally meets the guide vane 110*l* covering the full radius, but cannot rotate further. The rest of the guide vanes increase in size in such a way that the air coming from the air inlet first meet the smallest guide vane covering the smallest part of the radius between the pipe wall and the outer wall of the air disperser and the guide vane positioned at approximately 360° from the air inlet is the largest guide vane covering most of the radius between the pipe wall and the outer wall of the air disperser.

It should be understood that any type of drying air inlet, here shown as radial or tangential, may be combined with any relevant atomizing means to atomize the feed. Here is shown nozzle means and a rotary atomizer wheel. A person skilled in the art will select between nozzle means, such as e.g. pressure nozzles and two-fluid nozzles, rotary atomizers or other droplet generating means e.g. such as using ultrasound or single droplet generation.

For any of the two embodiments described in details above the axial velocity of the drying air in the pipe lie in the range of 1 to 60 m/s, and the overall normalized standard deviation on axial velocities is less than 8%, preferably less than 6%.

The invention should not be regarded as being limited to the embodiment shown and described in the above but various modifications and combinations of features may be carried out without departing from the scope of the following claims.

The invention claimed is:

1. An air disperser for a spray dryer, comprising:

an air inlet, a cylindrical pipe having a pipe wall defining an air outlet area equipped with one or more atomizing means, said pipe having a longitudinal axis defining an axial direction and a radial direction extending substantially perpendicularly to said axial direction, a cylindrical outer wall provided around the cylindrical pipe and defining a space between the pipe wall and the outer wall of the air disperser, a plurality of guide vanes, provided in said space, wherein the guide vanes are positioned substantially vertically in the axial direction and substantially on the radii between the pipe wall and the outer wall of the air disperser, and wherein at least one of said guide vanes covers at least 90% of the full radius from the pipe wall in the direction towards the outer wall of the air disperser, and the rest of said guide vanes are distributed on radii along the circumference of the pipe, said guide vanes being of various sizes.

2. An air disperser according to claim 1, wherein the guide vanes are spaced from each other in such a way that the length of the curved pipe wall between any two neighbouring guide vanes is substantially identical.

3. An air disperser according to claim 1, wherein the shape of each guide vane is substantially plane.

4. An air disperser according to claim 1, wherein the air inlet is a radial air inlet.

5. An air disperser according to claim 4, wherein the number of guide vanes lies between 3 and 20.

6. An air disperser according to-claim 4, wherein the guide vanes are only positioned in the space between 10° and 350° from the air inlet.

7. An air disperser according to claim 4, wherein the guide vane positioned opposite to the air inlet is covering at least 90% of the full radius from the pipe wall in the direction towards the outer wall of the air disperser.

8. An air disperser according to claim 4, wherein the guide vane positioned opposite to the air inlet is substantially covering the full radius between the pipe wall and the outer wall of the air disperser.

9. An air disperser according to claim 4, wherein the guide vanes increase in size in such a way that the guide vane closest to the air inlet is the smallest guide vane covering the smallest part of the radius between the pipe wall and the outer wall of the air disperser and the guide vane opposite to the air inlet is the largest guide vane covering most of the radius between the pipe wall and the outer wall of the air disperser.

10. An air disperser according to claim 4, wherein the guide vanes are positioned symmetrically with regard to a vertical plane seen from the air inlet to the guide vane opposite the air inlet in respect of the positions and the sizes of the guide vanes.

11. An air disperser according to claim 1, wherein the air inlet is a tangential air inlet.

12. An air disperser according to claim 11, wherein the number of guide vanes lies between 4 and 30.

13. An air disperser according to claim 11, wherein the guide vane covering at least 90% of the full radius from the pipe wall in the direction towards the outer wall of the air disperser is the guide vane positioned at approximately 360° from the air inlet.

14. An air disperser according to claim 11, wherein the guide vane covering the full radius between the pipe wall and the outer wall of the air disperser is the guide vane positioned at approximately 360° from the air inlet.

15. An air disperser according to claim 11, wherein the guide vanes increase in size in such a way that the air coming from the air inlet first meets the smallest guide vane covering the smallest part of the radius between the pipe wall and the outer wall of the air disperser and the guide vane positioned at approximately 360° from the air inlet is the largest guide vane covering most of the radius between the pipe wall and the outer wall of the air disperser.

16. An air disperser according to claim 1, wherein the air dispenser is configured such that an axial velocity of the drying air in the pipe is in the range of 1 to 60 m/s.

17. An air disperser according to claim 16, wherein the air dispenser is configured such that an overall normalized standard deviation on axial velocities is less than 8%.

18. An air disperser according to claim 4, wherein the number of guide vanes lies between 5 and 12.

19. An air disperser according to claim 11, wherein the number of guide vanes lies between 12 and 24.

20. An air disperser according to claim 16, wherein the air dispenser is configured such that an overall normalized standard deviation on axial velocities is less than 6%.

* * * * *